March 3, 1964 R. KOHLER 3,123,095
MULTIPLE RING VALVE
Filed Dec. 20, 1962 2 Sheets-Sheet 1
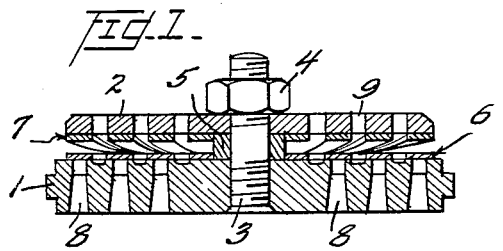
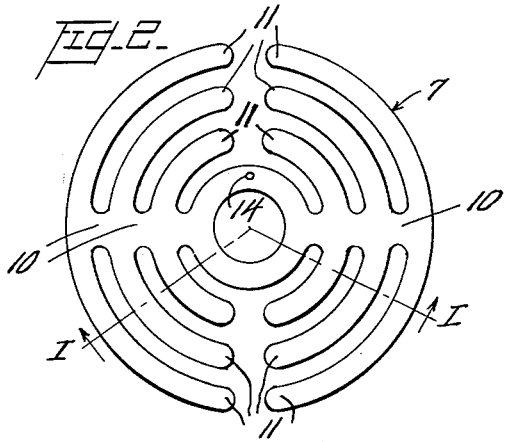
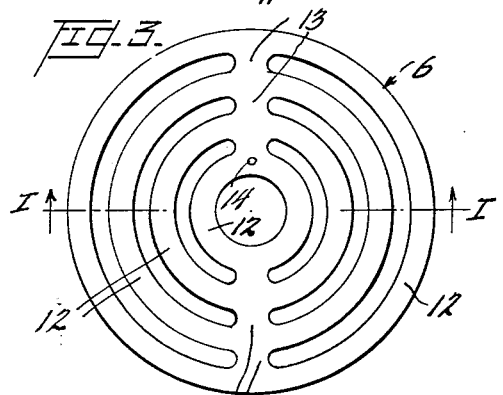
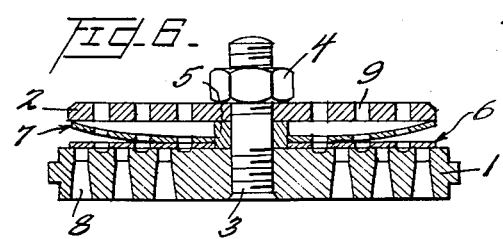
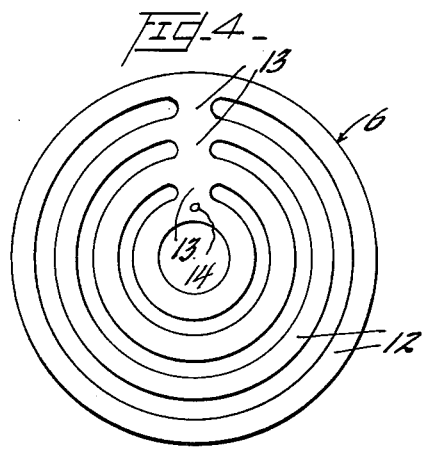
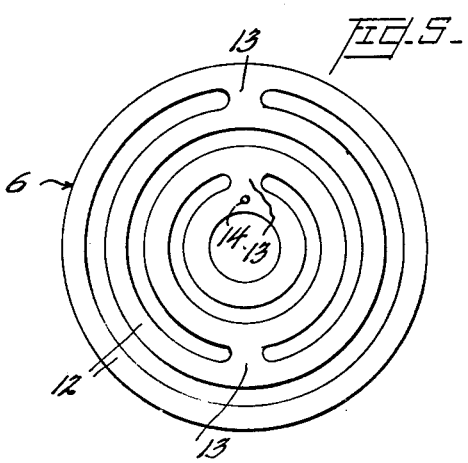
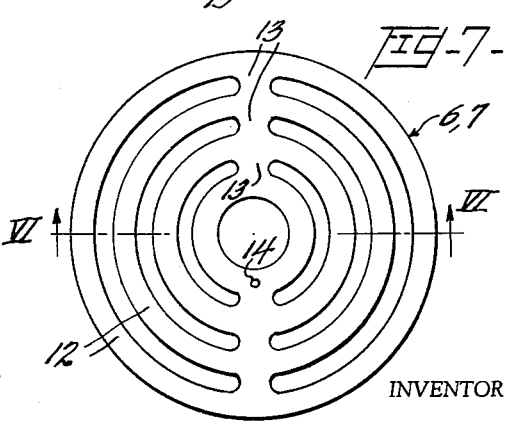
INVENTOR
Robert Köhler,
BY
Watson, Cole, Grindle & Watson
ATTORNEYS

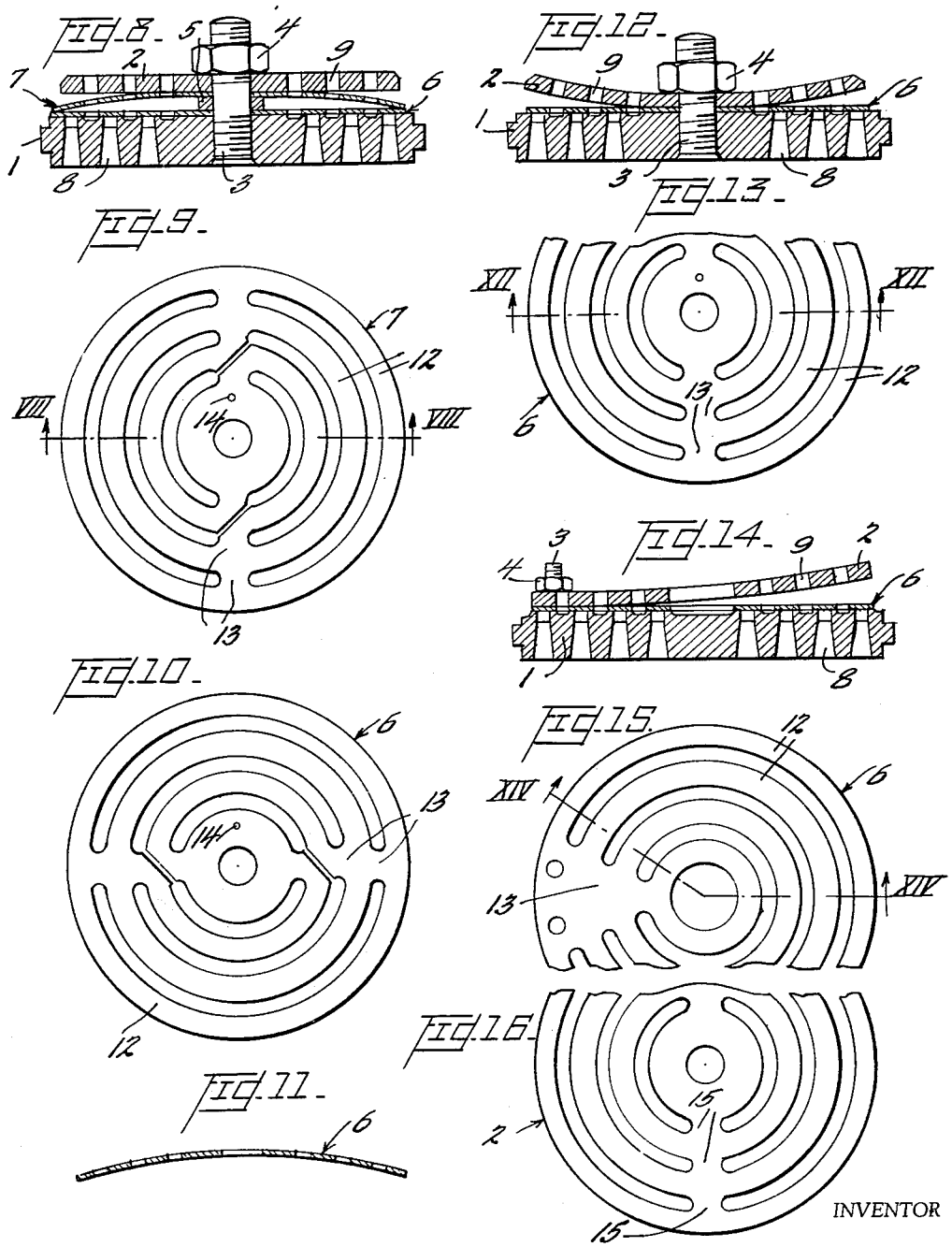

United States Patent Office 3,123,095
Patented Mar. 3, 1964

3,123,095
MULTIPLE RING VALVE
Robert Kohler, Schongau (Lech), Upper Bavaria, Germany, assignor to Hoerbiger Ventilwerke Aktiengesellschaft, Vienna, Austria
Filed Dec. 20, 1962, Ser. No. 246,125
Claims priority, application Austria Jan. 4, 1962
14 Claims. (Cl. 137—516.23)

The invention relates to automatic multiple ring valves, in particular for high-speed piston-type compressors.

The movable closing elements of conventional multiple ring valves of this type are frequently subject to premature wear as both the frequency and force of the strokes of the valve plates generally used as a closing means impinging upon the valve seats and guards increase with the number of revolutions of the compressor. The said blow stresses frequently exceed the bending stresses of the valve plate because of the differential pressure to which it is subject in its closed position and add to the often considerable body stresses remaining in the valve plate as a result of manufacturing processes or produced in operation, such as for example, by irregular temperature rises. These body stresses are particularly noticeable in conventional slotted valve plates for multiple ring valves, whereas they are, for obvious reasons, of minor importance in isolated rings. However, the multiring slotted valve plates offer certain fundamental advantages, such as with regard to the sliding or frictionless guiding system, the provision of locking springs etc. which makes any improvement in slotted valve plates particularly important.

According to a known design of similar multiple ring valves, the relatively rigid—as compared with the single ring variety—multi-ring slotted valve plate is given greater elasticity by the provision of additional radial slots. However, in that case it will not be possible to provide the valve seats with conventional annular grooves (which can be easily, accurately and cheaply manufactured by turning) above their radial webs or with annular sealing borders, as his would produce leaks in such places where they cross the radial slots of the valve plates.

In order to eliminate these shortcomings and to make it possible to use the conventional inexpensive valve seats, the invention is based upon conventional multiple ring valves with a closing element located between the seat and the valve guard, comprising a solid elastic valve plate with solid concentric rings interconnected by means of linking webs.

It is the object of the present invention to increase the life of the valve as well as of the component parts thereof and to reduce the noise produced by the valve in operation.

Accordingly, the invention provides for the location of the linking webs of all concentric rings on the same diameter of the valve plate. This will result in a considerable increase of the elasticity of the valve plate both in its plane and in perpendicular relation thereto. According to the invention two webs each can be provided between neighbouring rings in symmetrical arrangement on both sides of the center of the plate. In order to further increase elasticity, it is also possible to provide only one web each between neighbouring rings, said webs being either located all on the same side or alternatingly on different sides of the plate center. Multi-ring slotted valve plates according to the invention obviously permit the use of convenional valve seats with annular grooves, sealing borders, and the like or without, whereas any body stresses, for example caused by irregular temperature rises are reduced exactly or almost to the same extent as with individually isolated rings due to the substantially diminished radial coupling of the rings as compared with multi-web slotted valve plates of conventional design.

While on the one hand, the life of the valve plates according to the invention is increased as a result of their greater radial elasticity due to lesser body stresses, the same purpose is, on the other hand, achieved by their greater axial elasticity brought about by softening the impact during the opening and closing operations of the valve. This improvement is further enhanced by additional measures which can be applied to rigid multi-web valve plates of conventional design, if ever, with considerable difficulty only. For example, according to a further feature of the invention, the valve plate can be loaded in the area of one diameter only, preferably alongside the webs or in perpendicular relation thereto, for example by means of one or a plurality of spring plates, helical springs or tongues. The valve guard preferably presents a plane underface, so that the stroke of the valve plate will be the same everywhere in order to open up the largest clearance area possible. It was found to be particularly advantageous to load the valve plate according to a preferred embodiment of the invention by at least one spring plate, the concentric rings of which are interconnected by means of no more than two webs each located on the same diameter of the spring plate and rounded quasi-cylindrically, the generating lines of the cylinder surface extending in parallel relation to the diameter of the valve plate traversing the linking webs.

According to another embodiment of the invention, the isolated valve plate can be of arcuate design. Preferably the valve plate is cylindrically rounded, although a plate-shaped curvature of the valve plate has also proved advantageous. As a result of this arcuate design, particularly in conjunction with the provision of appropriate spring means, the opening and closing operations of the valve plate are performed progressively and not simultaneously. At the same time, the sealing of the closed valve can be improved by greater uniformity of the contact pressure at the sealing surfaces.

The valve according to the invention can be of a particularly simple design if vaulted valve guards are used and advantage is taken of the inherent elasticity of the valve plates. According to the invention, the latter can be positively clamped against the valve seat either alongside the webs or peripherally in the area of its outer ring, thereby providing flaplike arrangements offering a high degree of noiselessness. Conventional valve plates comprising a plurality of rings are unsuitable for similar embodiments on account of their relatively poor elasticity.

According to the invention it is of further advantage to provide valve guards comprising concentric rings interconnected by no more than two webs each located on the same diameter of the valve guard and preferably arranged in a manner similar to the one used for the valve plate and/or for the spring plate, thereby reducing the number of webs in the valve guard and obtaining approximate coincidence between the webs and flow channels of the spring plate, resulting in an increase of channel sections and a reduced resistance to flow which can be further decreased by the provision of nozzlelike shapes in the valve guard or the like in a manner known per se. If minor pressure losses are not required, the valve stroke can be shortened which will result in impacts of lesser force and noise and in an increase of the life of the valve plates.

If the closing forces of the valve as produced by the measures hereabove described are to be increased, additional helical springs or tongues can be incorporated so as to act preferably in the area of the webs of the valve plate. Further technical and economic advantages are obtainable by making the valve plate of plastics and by incorporating rubbing plates to reduce wear, retaining springs to prevent leakages and the like. Furthermore, the valve plate and/or the spring plates of the multiple ring valve according to the invention can be guided slidingly or frictionless by means of guide strips or guide plates.

Further details and features of the invention will appear from the following description of several embodiments of the invention with reference to the accompanying drawings in which:

FIGURES 1 to 3 show a first embodiment of the invention:

FIGURE 1 being an axial section of the valve, FIGURE 2 a plan view of the spring plate, and FIGURE 3 a plan view of the valve plate. The cross-sections of the spring plate and of the valve plate shown in FIGURE 1 are indicated by line I—I in FIGURES 2 and 3 respectively.

FIGURES 4 and 5 are plan views of further variants of the valve plate according to the invention;

FIGURES 6 and 7 illustrate another embodiment of the invention, FIGURE 6 being an axial section through the valve and FIGURE 7 a plan view of the spring plate and the valve plate, both being of the same shape;

FIGURES 8 to 10 show a further embodiment of the invention, FIGURE 8 being an axial section through the valve, FIGURE 9 a plan view of the spring plate and FIGURE 10 a plan view of the valve plate. The section through the spring plate and the valve plate in FIGURE 8 is indicated by line VIII—VIII in FIGURES 9 and 10 respectively.

FIGURE 11 is a cross-sectional view of another embodiment showing the valve plate according to the invention;

FIGURES 12 and 13 show another embodiment of the invention, FIG. 12 illustrating an axial section of the valve and FIGURE 13 a plan view of the corresponding valve plate;

FIGURES 14 and 15 show yet another embodiment, FIGURE 14 being an axial section through the valve and FIGURE 15 a plan view of the valve plate; and FIGURE 16 finally shows a plan view of a variant of the guard of a valve according to the invention.

In all figures of the drawings identical component parts of the valve are indicated by the same reference numbers.

The valve shown in FIGURES 1 to 3 comprises a valve seat 1 and a guard 2 interconnected by means of bolt 3 and nut 4. A washer 5 is provided between the valve seat 1 and the guard 2, said washer determining the distance between the said two parts and in this instance serving also as a guide for the closing means slidably arranged in the clearance between the valve seat 1 and the guard 2. The closing means comprises a solid (one-piece) valve plate 6 loaded by a spring plate 7. In the valve seat 1 flow channels 8 and in the valve guard 2 flow channels 9 are provided.

The spring plate 7 illustrated in FIGURE 2 comprises concentric ring elements interconnected by radial webs 10 and having their extremities bent out of the plane of the spring plate as tongues 11. The valve plate 6 illustrated in FIGURE 3 comprises solid concentric rings 12 interconnected by webs 13. The bore 14 provided in the valve plate 6 and in the spring plate 7 serves for the passage of a pin fixed in the valve seat 1 or in the valve guard 2 securing the plates 6 and 7 against rotation. The webs 13 between all neighboring rings 12 are located on the same diameter of the valve plate 6, so that the ring elements between the webs 13 are movable independently from one another. As a result, the valve plate 6 is elastic both in its plane and in perpendicular relation thereto, so that body stresses, and in particular, internal stresses due to irregular temperature rises, can be compensated on the one hand, and on the other hand, the impact produced by the opening and closing operations of the valve is attenuated. Both effects result in a considerable increase of the life of the valve plate.

The elasticity of valve operation is further enhanced by this embodiment of the invention inasmuch as the spring plate 7 bears upon the valve plate 6 in the area of one diameter only, that is in the area of the diameter on which the webs 13 are located. Consequently, the unloaded free sections of the rings 12 will open the corresponding areas of the flow passages 8 earlier and close them later than the ring sections directly loaded by the spring plate 7, the valve plate 6 being elastically deformed or vaulted, thereby attenuating the impact on the valve seat 1 and the valve guard 2. However, the valve plate 6 can also be loaded alongside another diameter, in particular in perpendicular relation to the diameter extending through the webs.

The rings 12 of the valve plate illustrated in FIGURE 3 comprise webs 13 on both sides of the plate center, whereas in the embodiments shown in FIGURES 4 and 5 a single web 13 each is provided between the neighboring rings 12 of the valve plate 6. According to FIGURE 4 all webs 13 are located on the same side of the plate center, whereas as shown in FIGURE 5 they are alternatingly located on different sides of the plate center. It can be easily seen from these examples that by appropriately distributing the webs 13 alongside the same diameter of the valve plate 6, if necessary also by a variation of the web widths, the elasticity of the valve plate 6 can be adapted to given requirements.

The embodiment as illustrated in FIGURES 6 and 7 differs from the design of the valve as shown in FIGURES 1 to 3 in that it provides for a spring plate 7, the plan view of which is exactly the same as for valve plate 6. This plan view is shown in FIGURE 7 with all webs 13 located on the same diameter of the valve plate 6 and the spring plate 7, respectively. In addition, the spring plate 7, as shown in FIGURE 6, is quasi-cylindrically vaulted, the generating lines of the cylindrical surface extending in parallel relation to the diameter of the spring plate 7 traversing the webs 13. In the valve as shown in FIGURE 6 the hollow side of the spring plate 7 faces the valve guard 2, the webs 13 of both plates 6 and 7 being located exactly one above the other. In that case, the valve plate 6 is loaded alongside the diameter on which the webs 13 are located. This arrangement makes for a most satisfactory operation of the valve. At the beginning of the opening operation or with a minor rate of flow the plates 6 and 7 are not lifted in the area of the webs 13, but the free ring sections of the valve plate 6 located to the left and right of the webs 13 are more or less pressed against the spring plate 7. Only after the rate of flow has assumed major proportions is the valve fully opened and reaches the point of the least resistance. By appropriately dimensioning the thickness of the valve and spring plates, by altering the number of spring plates used in the valve and their height of curvature and like measures it is possible to influence the operation of the valve to a considerable extent according to given requirements.

Another embodiment of the invention according to FIGURES 8 to 10 differs from the valve as shown in FIGURES 6 and 7 by the use of a frictionlessly guided valve plate 6 and a spring plate 7 of the same type, the hollow side of which faces the valve plate 6, said spring plate thus being in contact with the latter via the outer borders of its rings. This contact may be established in the area of the webs of the valve plate 6, the diameters of the valve plate 6 and the spring plate 7 carrying the webs 13 crossing each other at right angles, as shown in FIGURES 9 and 10. In this position of the spring plate 7 the amount of its mass following the movement of the valve plate 6 diminishes, which is particularly advantageous if the compressor is operated at high speeds. Moreover, it is easier to individually measure and adjust the forces acting on the various rings of the spring plate than would be possible if the hollow side were facing upwards.

As is customary with multi-web plates, the valve plates 6 as used in valves according to the invention can be plane prior to their insertion in the valve assembly. However, they may also be vaulted as shown by the example illustrated in FIGURE 11 where the valve plate 6 is quasi-cylindrically vaulted, the generating lines of the cylinder extending either in parallel or perpendicular relation to the diameter traversing the webs. When incorporated in the valve assembly, the valve plate 6 may be facing the valve seat with its hollow side and loaded or clamped down by means of springs in the area of its apex, or else its hollow side may be facing the valve guard, in which case the load is carried externally in the area of the vaulted ring sections.

The two particularly simple designs of the valve as illustrated in FIGURES 12 to 15 may be preserved with the use of the valve plates 6 according to the invention by taking advantage of their inherent elasticity which may be altered as required by providing a vaulted shape, in which case it will not be necessary to provide special spring means. In the valve as shown in FIGURES 12 and 13 the valve plate 6 is clamped down against the valve seat 1 by the valve guard 2 alongside the diameter carrying the webs 13, the valve guard 2 being connected to the valve seat 1 by means of a central bolt 3 and nut 4. At least the underside of the valve guard 2 is of cylindrical design, the generating lines of the cylinder extending in parallel relation to the diameter of the valve plate 6 traversing the webs 13. The medium flowing through the valve will lift the valve plate 6 which apparently works flap-fashion and it can perform the opening and closing operations by rolling on the valve guard 2 practically in a smooth and noiseless manner.

Similar in operation is the valve according to FIGURES 14 and 15, where the valve plate 6 located between the valve seat 1 and the guard 2 is, however, clamped down at its outer periphery by means of bolts 3 and nuts 4. Moreover, here the diameter carrying the webs 13 and the generating lines of the cylinder of the vaulted valve guard 2 do not extend in parallel relation to each other but cross each other at right angles. This design is useful where a unilateral flow-off from the valve is desired, whereas valves according to FIGURES 12 and 13 are more suitable for a symmetrical flow-off. Both designs require a few elements only for their manufacture and are, therefore, economically advantageous.

Finally, FIGURE 16 shows the plan view of a valve guard 2, where the webs 13 thereof are arranged in the same way as with the valve plate 6 on the same diameter of the valve guard 2. Preferably the webs of the valve plate 6, of the spring plate 7, if provided, and of the valve guard 2, coincide with each other, thus producing larger channel cross-sections and less resistance to the flow of the medium.

I claim:

1. A multiple ring valve, in particular for piston-type compressors, comprising a valve seat, a valve guard arranged in spaced relation to said valve seat, closing means located between the said valve seat and the valve guard and comprising an one-piece elastic valve plate composed of concentric rings interconnected by means of linking webs, the linking webs of all concentric rings being located on the same diameter of the valve plate.

2. A multiple ring valve as claimed in claim 1, wherein one linking web only is provided between the neighboring rings of the valve plate.

3. A multiple ring valve as claimed in claim 2, wherein all linking webs of the valve plate are located on the same side of the plate center.

4. A multiple ring valve as claimed in claim 2, wherein the linking webs of the valve plate are alternatingly located on different sides of the plate center.

5. A multiple ring valve as claimed in claim 1, also comprising spring means between the valve plate and the valve guard, said spring means loading the valve plate in the area of one diameter of the valve plate only.

6. A multiple ring valve as claimed in claim 5, wherein the said spring means load the valve plate alongside the linking webs located on the same diameter.

7. A multiple ring valve as claimed in claim 5, wherein the said spring means load the valve plate alongside a diameter of the same extending in perpendicular relation to the diameter traversing the linking webs.

8. A multiple ring valve as claimed in claim 5, wherein the spring means comprise at least one spring plate composed of concentric rings having linking webs arranged between them, all of the said linking webs being located on the same diameter of the spring plate, said spring plate being quasi-cylindrically rounded, the generating lines of the cylindrical surface extending in parallel relation to the diameter of the spring plate traversing the linking webs.

9. A multiple ring valve as claimed in claim 1, wherein the valve plate is of vaulted design prior to its incorporation in the valve assembly.

10. A multiple ring valve as claimed in claim 9, wherein the valve plate is cylindrically rounded.

11. A multiple ring valve as claimed in claim 1, wherein the valve guard is cylindrically rounded, the valve plate being clamped between the valve seat and the cylindrically rounded valve guard in the area of its diameter where the linking webs are located.

12. A multiple ring valve as claimed in claim 1, wherein the valve guard is cylindrically rounded, the valve plate being clamped in between the valve seat and said valve guard in the area of the outer ring of said valve plate, the generating lines of the cylindrical vault of the valve guard crossing the diameter traversing the linking webs of the valve plate at a right angle.

13. A multiple ring valve as claimed in claim 1, wherein the valve guard comprises concentric rings with linking webs between them, all of which are located on the same diameter of the valve guard.

14. A multiple ring valve as claimed in claim 13, wherein the said linking webs of the valve guard are provided in equal numbers and in the same arrangement as the linking webs of the associated valve plate.

No references cited.